United States Patent [19]

Voss

[11] 4,126,335
[45] * Nov. 21, 1978

[54] HOSE AND PIPE COUPLING

[75] Inventor: Hans-Hermann Voss, Wipperfürth, Fed. Rep. of Germany

[73] Assignee: Armaturenfabrik Hermann Voss, Wipperfurth, Fed. Rep. of Germany

[*] Notice: The portion of the term of this patent subsequent to Apr. 6, 1993, has been disclaimed.

[21] Appl. No.: 733,747

[22] Filed: Oct. 19, 1976

[30] Foreign Application Priority Data

Oct. 23, 1975 [DE] Fed. Rep. of Germany ....... 2547411

[51] Int. Cl.² ............................................. F16L 37/00
[52] U.S. Cl. ......................................... 285/39; 285/45; 285/81; 285/321
[58] Field of Search ....................... 285/45, 81, 321, 39, 285/179; 403/23, 326; 151/19 A; 85/32.1

[56] References Cited

U.S. PATENT DOCUMENTS

| 2,070,982 | 2/1937 | Candee | 285/81 X |
| 2,110,397 | 3/1938 | Kangas | 403/326 |
| 2,413,730 | 1/1947 | Samiran | 285/45 |
| 3,151,891 | 10/1964 | Sanders | 285/321 X |
| 3,281,757 | 10/1966 | Bonhomme | 285/321 X |
| 3,290,068 | 12/1966 | Jackson | 285/321 X |
| 3,314,696 | 4/1967 | Ferguson et al. | 285/321 |
| 3,513,875 | 5/1970 | Nelson | 403/326 X |
| 3,560,026 | 2/1971 | Roe | 285/321 X |
| 3,948,548 | 4/1976 | Voss | 285/39 X |

FOREIGN PATENT DOCUMENTS 939,185 2/1956 Fed. Rep. of Germany ........... 285/321

Primary Examiner—Werner H. Schroeder
Assistant Examiner—Moshe I. Cohen
Attorney, Agent, or Firm—Allison C. Collard; Thomas M. Galgano

[57] ABSTRACT

In a hose and pipe coupling having a coupling head and a nozzle which is insertable therein and which is lockable therewith by a locking element inserted in the coupling head, wherein the locking element consists of a spring-elastic ring having a slit and onto which are formed two oppositely directed arcuate spring arms embracing the coupling head and starting from the slit, and the coupling head having a slit-shaped circumferential opening for receiving a plug as well as an internal annular groove for the partial reception of the spring-elastic ring, the nozzle at the coupling side being provided with an annular groove for at least partially receiving the spring-elastic ring in the connected condition of the nozzle, wherein the improvement consists of a protective cap displaceably arranged on the coupling head so that after the nozzle and coupling head are connected together, the cap is slid over the elastic ring. The elastic ring includes gripping knobs formed on the outer ends of its spring arms. The protective cap has radial slits which are open at the rim, and the gripping knobs engage the radial slits so that the protective cap at its end face facing the nozzle includes an inwardly drawn collar engaging behind the coupling head.

4 Claims, 4 Drawing Figures

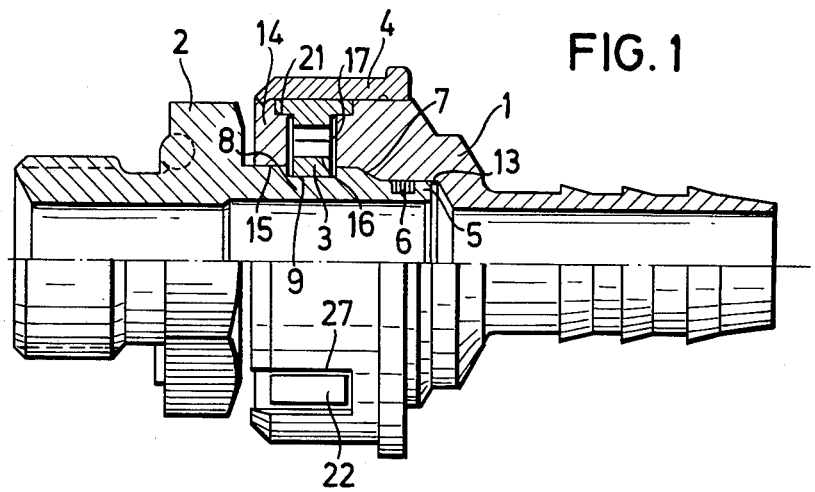
FIG. 1
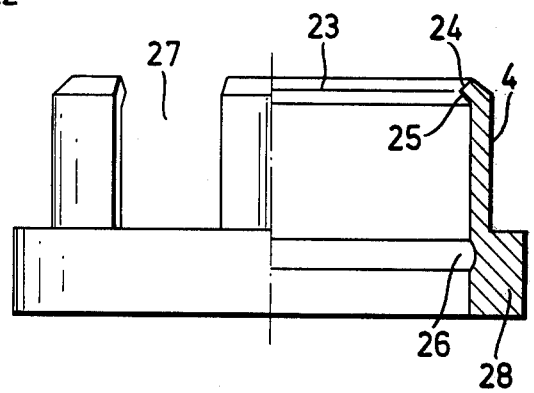
FIG. 3
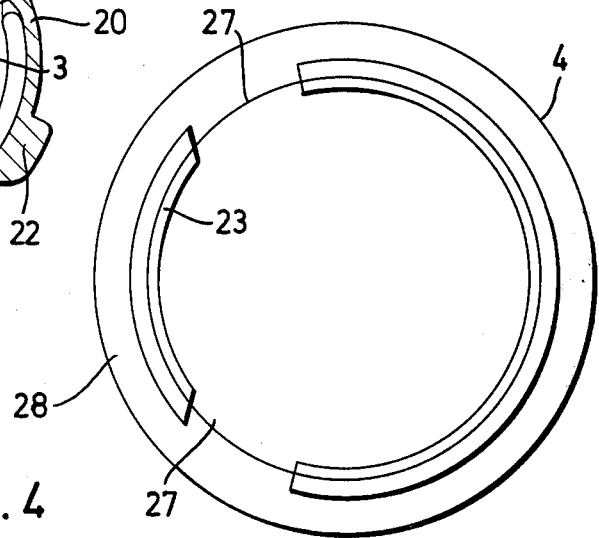
FIG. 2
FIG. 4

HOSE AND PIPE COUPLING

This invention relates to a hose and/or coupling consisting of a coupling head, a nozzle, which is insertable therein and which is lockable therewith by a locking element inserted in the coupling head. The locking element consists of a spring-elastic annular ring having a slit and onto which are formed two oppositely directed arcuate spring arms embracing the coupling head and starting from the slit. The coupling head is provided with a slit-shaped circumferential opening for receiving a plug, as well as an internal annular groove for the partial reception of the spring-elastic ring. The nozzle at the coupling side has an annular groove for partially receiving the spring-elastic ring in the plugged-in state of the nozzle (according to parent U.S. Pat. No. 3,948,548).

In the case of the hose and/or pipe coupling according to the main patent, it is expedient and advantageous to use such a spring-elastic ring as a locking element since it is constructed with gripping knobs or cams at the outer ends of the spring arms, since these make possible a light splaying apart of the spring-elastic ring directly by hand. Further described in the main patent is a protective cap, which is slipped over the coupling head to cover the spring-elastic ring and which displays a bore to let through the nozzle to be plugged into the coupling head. The cap permits a sealing of the internal coupling space against the ingress of dirt. As practice has shown, the sealing of the internal coupling space is very expedient particularly in the case of such hose and/or pipe couplings, the use of which ensues under difficult conditions, for example, in the brake duct system of motor vehicles, where an increased occurrence of dirt normally accumulates.

The cap according to the main patent is provided with a bowl-shaped construction with cylindrical wall and planar or flat bottom with passage openings for the nozzle. By virtue of this construction, the cap shown and described in the main patent is not suited to cooperate with a hose and/or pipe coupling, the spring-elastic ring of which is constructed with gripping knobs or cams at the outer ends of the spring arms. Moreover, the cap according to the main patent also possesses no detent means which can effectively prevent its sliding off from the coupling head.

It is accordingly as object of the present invention to develop a hose and/or pipe coupling of the above-mentioned kind to meet the requirement for a more rapid and simpler uncoupling by means of gripping knobs at the locking element and on the other hand the requirement for dirt-tight closure of the internal coupling space by means of a protective cap. Moreover, the protective cap should be attached by a captive seating on the coupling head.

This problem is solved by a hose and/or pipe coupling which according to the invention uses a protective cap which is displaceably arranged on the coupling head and which after the nozzle and coupling head are plugged together, can be slipped over the elastic ring. The elastic ring has gripping or engaging knobs or cams formed on the outer ends of its spring arms and the protective cap has radial slits which are open at the rim and into which the gripping knobs engage. The protective cap at its end face or front end facing the nozzle has an inwardly drawn collar or shoulder engaging behind the coupling head. By these inventive measures, there is a functional merger of the spring-elastic ring with the protective cap. After the protective cap is slipped over the spring-elastic ring, the cap, apart from providing a reliable sealing function against the internal coupling space, still effects a radial support of the spring-elastic ring, so that the spring arms of the ring are not intentionally moved outwardly nor the gripping knobs intentionally compressed. The spring-elastic ring is thus constrainedly held in the nozzle groove. This constrained retention is maintained up to the withdrawal of the protective cap, since an unintended positional change of the protective cap is prevented due to the shoulder or shaped-on collar engaging behind the coupling head. A limitation of the slipping-on movement of the protective cap is advantageously attained by the gripping knobs meeting the ends of the slits.

To simplify the insertion and removal of the protective cap in the assembly and disassembly onto or off the coupling head, the inwardly drawn collar of the protective cap is constructed as a tooth with an included angle of about 90°, wherein the tooth flanges are preferably aligned symmetrically to the longitudinal central axis of the protective cap. The tooth flanges each act as inclined ramps for the front edges of the coupling head and thus facilitate the insertion and removal of the protective cap.

Due to the inwardly drawn collar, the protective cap is springily splayed or spread apart according to the height of the collar during the insertion and removal of the coupling head. In order that the shank of the protective cap can softly be splayed apart springily, the protective cap has an inner annular groove disposed at a small distance from the ends of the slits.

The insertion and removal of the protective cap from the coupling head can be further simplified if the protective cap is provided with an outer encircling collar serving as hand-grip at its end region facing away from the slits.

The protective cap is preferably of plastic or synthetic material, wherein a material is used which endures the temperatures given in drying boxes, remains permanently elastic and can easily be written upon with ink. Furthermore, the protective cap can be produced in different colors, for example, in the four colors for the circuits of the EEC brake.

Other objects and features of the present invention will become apparent from the following detailed description when taken in connection with the accompanying drawing which discloses a few embodiments of the invention. It is to be understood, however, that the drawing is designed for the purpose of illustration only and not intended as a definition of the limits and scope of the invention disclosed.

In the drawing, wherein similar reference characters denote similar elements throughout the several views:

FIG. 1 shows a coupling consisting of a coupling head and nozzle connected together according to the invention;

FIG. 2 is a sectional view through the mouthpiece of a coupling head with inserted spring-elastic ring;

FIG. 3 is a protective cap for the coupling in an elevation view; and,

FIG. 4 is a plan view according to FIG. 3.

In FIG. 1, the coupling consists essentially of a coupling head 1 and a nozzle 2, as well as spring-elastic ring 3. Ring 3 serves as a locking element, is encompassed by a protective cap 4 displaceably arranged on coupling head 1.

Nozzle 2 has a locking region which consists of a cylindrical part 5 and a sealing ring 6 which is inserted into a groove. A cone or tapered portion 7 serves essentially to widen the spring-elastic ring 3 and the largest diameter of which goes over into a cylindrical shank part 8. Worked into shank part 8 is an annular groove 9 for receiving the inner circular ring surface of spring-elastic ring 3.

Coupling head 1 as well as nozzle 2 have a passage bore for the through-flow of the respective medium with a cylindrical bore part 13 against which sealing ring 6 is sealed tight. Coupling head 1 at its mouthpiece 14 has a forward bore part 15 with a worked-in annular groove 16, the diameter of which is greater than the outer diameter of ring 3, for receiving the outer rim region of ring 3. A slit-shaped circumferential opening 17 connecting inner groove 16 with the outside of the coupling head 1 is so dimensioned that ring 3 can be pushed from the side through this into coupling head 1 and into groove 16 (cf. also FIG. 2). The chord length A of circumferential opening 17 thus corresponds at least to the outer diameter of ring 3.

Spring-elastic ring 3, which is interrupted by a radial slit 18 constructed to be in labyrinth shape, has two formed spring arms 19 and 20 which begin in about the region of slit 18 and together form a circular arc which is greater than 180°, so that the ring is securely retained on the coupling head. Furthermore, formed at coupling head 1 is an outer annular groove 21 which lies opposite the inner annular groove 16 and is intended to receive the spring arms shaped onto ring 3.

When nozzle 2 is plugged in, cone 7 presses against the inner wall of ring 3 and thus splays this apart. As soon as cone 7 has been pushed through ring 3, the ring snaps into annular groove 9 since it has a tendency to seek its original position. Parts 1 and 2 are thus fixed relative to each other in an axial direction. During the disassembly, the ring is splayed to an extent that it no longer lies in groove 9 so that parts 1 and 2 can be drawn apart. To enable the ring to be splayed simply by hand, gripping knobs 22, which can possess a roughened surface, are formed at the outer ends of the spring arms 19 and 20.

To prevent the ingress of dirt, spray water or the like, into the interior coupling space, the invention provides a protective cap 4 which encloses spring-elastic ring 3 with its shaped-on spring arms 19 and 20 and which is displaceably arranged on coupling head 1. Protective cap 4 is constructed in the shape of a sleeve or jacket, and has at its end face, facing nozzle 2, an inwardly drawn collar 23 which is preferably constructed to be tooth shaped, and which engages behind coupling head 1 at its end face facing nozzle 2. Flanks 24 and 25 of tooth-shaped collar 23 form run-up ramps which facilitate the mounting or removal of the protective cap from coupling head 1.

To attain a soft yielding expansion of protective cap 4 during mounting and removal, protective cap 4 is provided with an inner annular groove 26. Protective cap 4 further includes radial slits 27, the depth and width of which are matched to the dimensions of gripping knobs 22 at spring arms 19 and 20. Finally, protective cap 4 is provided with an outer collar 28 which serves as a hand-grip to facilitate mounting and removal, and which connects directly to the ends of slits 27 and is constructed to be encircling.

While only a few embodiments of the present invention have been shown and described, it will be obvious to those skilled in the art that many changes and modifications may be made thereunto without departing from the spirit and scope of the invention.

What is claimed is:

1. In a hose and pipe coupling having a coupling head and a nozzle, which is insertable therein, and which is lockable therewith by a locking element inserted in the coupling head, wherein the locking element consists of a spring-elastic ring having a slit and onto which are formed two oppositely directed arcuate spring arms embracing the coupling head and starting from the slit, and the coupling head has a slit-shaped circumferential opening for receiving a plug as well as an internal annular groove for the partial reception of the spring-elastic ring, the nozzle at the coupling side being provided with an annular groove for at least partially receiving the spring-elastic ring in the connected condition of the nozzle, the improvement comprising a protective cap displaceably arranged on the coupling head so that after the nozzle and coupling head are connected together, said cap is slid over the elastic ring, wherein the elastic ring includes gripping knobs formed on the outer ends of its spring arms, said protective cap having radial slits which are open at the rim, and gripping knobs engaging said radial slits wherein said protective cap at its end face facing the nozzle includes an inwardly drawn collar engaging behind the coupling head.

2. The hose and pipe coupling according to claim 1, wherein said inwardly drawn collar of said protective cap is formed as a tooth with an included angle of about 90°.

3. The hose and pipe coupling according to claim 1 wherein said protective cap includes an internal annular groove which is arranged at a small spacing from the ends of the slits.

4. The hose and pipe coupling according to claim 1 wherein said protective cap at its end region facing away from slits includes an outer encircling collar serving as a hand grip.

* * * * *